US009597243B1

(12) United States Patent
Helmick et al.

(10) Patent No.: US 9,597,243 B1
(45) Date of Patent: Mar. 21, 2017

(54) MEDICAL PROCEDURE CHAIR

(71) Applicant: Midmark Corporation, Versailles, OH (US)

(72) Inventors: Thomas Helmick, Versailles, OH (US); Chris Herr, Goshen, IN (US)

(73) Assignee: Midmark Corporation, Versailles, OH (US)

( * ) Notice: Subject to any disclaimer, the term of this patent is extended or adjusted under 35 U.S.C. 154(b) by 0 days.

(21) Appl. No.: 14/622,899

(22) Filed: Feb. 15, 2015

Related U.S. Application Data

(60) Provisional application No. 61/940,387, filed on Feb. 15, 2014.

(51) Int. Cl.
*B60N 2/00* (2006.01)
*A61G 5/10* (2006.01)
*A61G 5/12* (2006.01)

(52) U.S. Cl.
CPC ...... *A61G 5/1067* (2013.01); *A61G 2005/127* (2013.01)

(58) Field of Classification Search
CPC .................................... A47C 7/44; B60N 2/22
USPC ... 297/354.12, 354.13, 353, 354.1, 383, 382
See application file for complete search history.

(56) References Cited

U.S. PATENT DOCUMENTS 4,007,962 A * 2/1977 Muller-Deisig ......... A47C 7/02 297/301.2
4,362,336 A * 12/1982 Zapf ........................ A47C 7/46 297/317
4,452,486 A * 6/1984 Zapf ....................... A47C 1/032 297/317
4,887,865 A * 12/1989 Dawidzon .............. B60N 2/609 297/229
5,042,875 A * 8/1991 Biggs, Sr. ................ A47C 4/52 297/188.01
5,288,138 A * 2/1994 Stulik ................ A47C 1/03255 297/302.1
5,860,702 A * 1/1999 Pilarczyk .................. B60P 3/38 297/354.13
5,904,402 A * 5/1999 Sabo ...................... A47C 1/143 297/354.13
5,909,923 A * 6/1999 DeKraker .............. A47C 1/023 297/285
6,412,870 B1 * 7/2002 Higgins ................... B60N 2/34 297/342
7,040,701 B2 * 5/2006 Tada ........................ A47C 1/02 297/256.13
7,313,836 B1 * 1/2008 Swezey ................ A47C 20/027 297/230.1
7,490,904 B2 * 2/2009 Hogg .................. A61G 5/1067 297/311
7,722,114 B2 * 5/2010 Smith .................. A47C 1/0352 297/340
8,262,157 B2 * 9/2012 Novak ................... A47C 1/146 297/16.2
8,585,135 B2 * 11/2013 Wilson ................... A47C 1/024 297/354.12
8,646,795 B2 * 2/2014 Cerreto ................ A61G 5/1067 280/250.1

(Continued)

*Primary Examiner* — Jose V Chen
(74) *Attorney, Agent, or Firm* — Matthew Beutler

(57) ABSTRACT

A medical procedure chair that includes a sitting area, a sliding seat back section, and a living hinge connecting the sitting area of the chair to a sliding seat back.

18 Claims, 11 Drawing Sheets

(56) References Cited

U.S. PATENT DOCUMENTS

| | | | | |
|---|---|---|---|---|
| 2009/0295209 | A1 * | 12/2009 | Lee | A47C 1/032 297/337 |
| 2012/0038196 | A1 * | 2/2012 | Lawson | B64D 11/06 297/354.13 |
| 2013/0161993 | A1 * | 6/2013 | Otsuka | B60N 2/442 297/354.12 |
| 2014/0103688 | A1 * | 4/2014 | Wilson | A47C 1/03211 297/284.7 |
| 2014/0265500 | A1 * | 9/2014 | Hough | A61G 5/14 297/340 |

* cited by examiner

MEDICAL PROCEDURE CHAIR

CLAIM OF PRIORITY

This application claims priority to U.S. 61/940,387.

BACKGROUND AND BRIEF SUMMARY OF THE INVENTION

The medical procedure chair lies at the center of the patient care experience in nearly all outpatient clinical settings. Recognizing the need for medical and dental tables and chairs that provide greater functionality and efficiency to the clinical space, the present invention is primarily directed to a feature of a medical procedure chair that increases both clinical functionality and aesthetic appeal. In particular, the primary focus of the present invention is a living hinge that connects the sitting area of a medical procedure chair to the seat back of the chair. This hinge allows the procedure chair to provide the comfort of a sliding back section as set forth in U.S. Pat. No. 6,212,713 while also allowing easy cleaning of the top surface of the chair as well as preventing the accumulation of debris and detritus in the area between the sitting area and seat back of the chair.

DETAILED DESCRIPTION OF THE INVENTION

Figure 1:
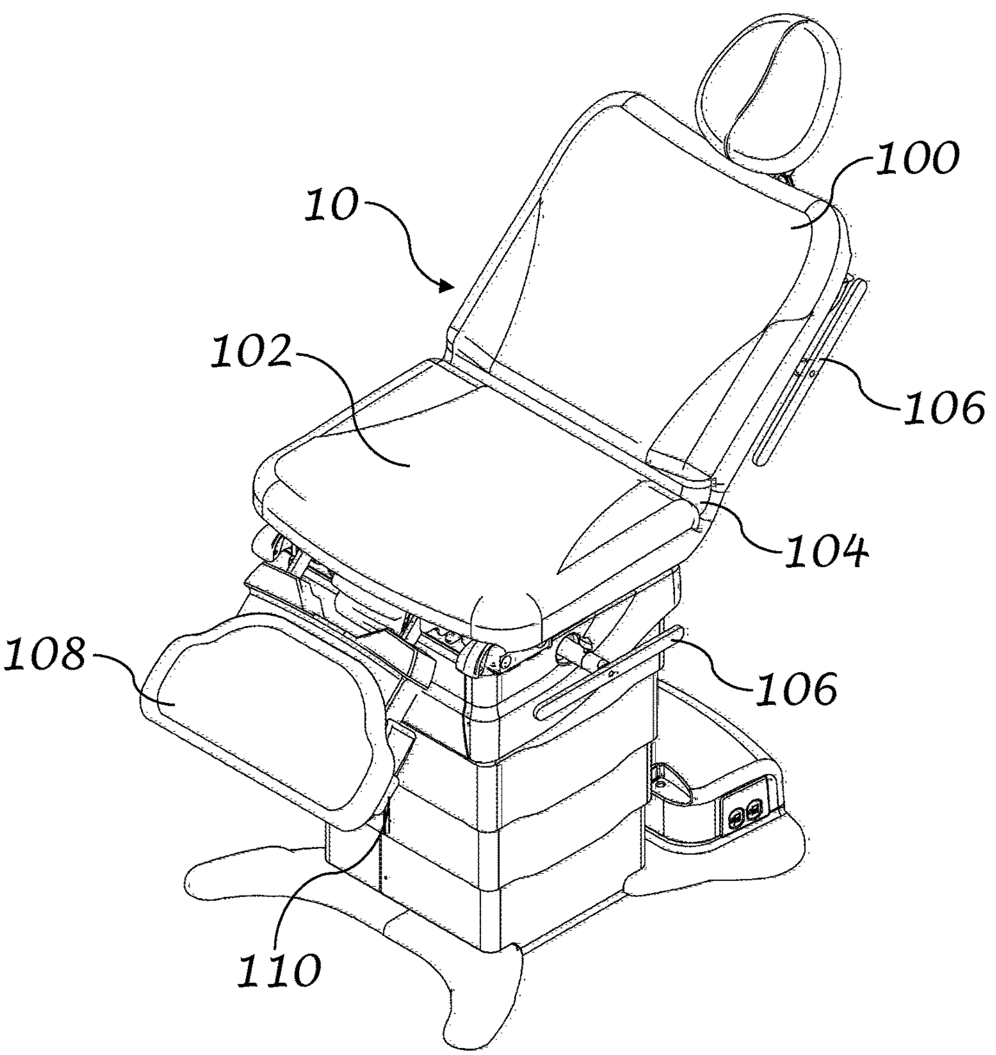
FIG. 1 Perspective view of the procedure chair of one embodiment of the present invention.

The present invention is directed to novel features and functions of a procedure chair for use in positioning and supporting a patient during a treatment or procedure that occurs in a clinical setting. Certain of the features and functions described herein allow a clinician to more efficiently and effectively utilize the procedure chair in his or her practice. Clinician as used herein refers to one whose specialized skill set allows them to competently participate in providing medical or dental care to a subject. Accordingly, clinician as used herein includes, but is not limited to, registered nurses, medical doctors, medical assistants, physician's assistants, nurse practitioners, dental hygienists, dental doctors (i.e. dentists), dental assistants, and the like.

For purposes of this disclosure, a procedure chair is a medical or dental examination chair used to support or position a subject's body during an outpatient medical or dental procedure, examination, or consultation. By way of example, but not limitation, the procedure chair of the present invention can include dental exam and operatory chairs and medical procedure chairs and chairs for various uses and of various styles. These tables and/or chairs can be either multi-purpose or specialty-specific. Specialty-specific tables and/or chairs can include tables and/or chairs for specialties such as oral surgery, pediatrics, podiatry, plastic surgery, orthodontics, dermatology, and gynecology, among others. For simplicity, medical or dental procedure chairs or tables as referenced above will hereinafter be collectively referred to as a procedure chair, unless otherwise noted.

In certain preferred embodiments of the present invention the procedure chair is adjustable. By adjustable it is meant that the chair can be adjusted, where applicable, in any or all of height, degree of incline of the back support, degree of incline of the foot support, height of foot support, angle of the sitting area, or overall angle of the procedure chair. By degree of incline of the back support, or seat back, it is meant the angle of the back support relative to the sitting area. By angle of the sitting area and overall angle of the procedure chair it is meant the angle of the sitting area and/or procedure chair with respect to the surface on which the procedure chair is placed. For purposes of this disclosure, the Tait-Bryan convention will be used to describe chair angles. Accordingly, adjustment of the angle of the sitting area or angle of the overall procedure chair refers to adjustment of the elevation and/or bank of the sitting area or overall procedure chair relative to the surface on which the chair is placed. Adjustment of the procedure chair can be accomplished through power-driven adjustment, such as with a hydraulic or mechanical actuator or the like, by manual adjustment, or a combination of the two. Hereinafter, power-adjustable procedure chair will be used to refer to a procedure chair that is adjusted or moved at least in part by power-driven adjustment, such as with a hydraulic or mechanical actuator. If the procedure chair is adjustable in height, this adjustment is preferably accomplished through the use of a scissors mechanism driven by a linear actuator. Although in other embodiments of the present invention this adjustment could be performed by simply using a linear actuator alone, without the use of a scissors mechanism.

The foot support of the procedure chair of the present invention can preferably move through an angle of at least about 90 degrees relative to the plane created by the large surface of the sitting area. Specifically, if the plane created by the large surface of the foot support is initially normal to the plane created by the large surface of the sitting area, the foot support can preferably move through an angle of at least about 90 degrees, or until the plane of the foot support is about parallel to the plane of the sitting area. Preferably as the foot support undergoes this motion into a horizontal position the foot support is simultaneously extended away from the procedure chair through a series of mechanical connections and linkages detailed in U.S. Pat. No. 6,926,366, which is hereby incorporated in its entirety by reference. Likewise, as the foot support is retracted into the vertical position these mechanical connections and linkages cause the foot support to draw closer to the procedure chair, or decrease in overall length of the foot support. In certain embodiments of the present invention, the foot support further includes a latching mechanism and a track mechanism that allows the foot rest to be even further extended by a user of the procedure chair. Specifically, the user can disengage the latching mechanism by depressing a button or pulling a lever or the like and then slide the foot support surface on the track mechanism to position the foot support either closer to or farther from the procedure chair, reengaging the latching mechanism once the foot support is in the desired position.

In various preferred embodiments, the procedure chair of the present invention also includes sensors built into or attached to the chair capable of sensing a current position of the chair and transmitting this position to a processor that is part of the chair and/or to another device. One example of such a sensor is a limit switch designed to prevent the procedure chair from being adjusted beyond certain predetermined stop points. Still other sensors include sensors for determining if an obstruction is interfering with movement of the chair. For example if a user unintentionally places an appendage in such a way as to interfere with procedure chair movement, force sensors or optical sensors can be used to stop movement of the procedure chair and prevent user injury. In one preferred embodiment of the present invention, the procedure chair includes pressure-based safety switches connected to the foot rest, the underside of the sitting area or on top of lift pillar, and/or the back of the seat back. These pressure-based safety switches are preferably connected to spring-supported pressure plates that are depressed when a relevant part of the procedure chair contacts an obstruction. Upon triggering of the pressure-based safety switches, the movement of the chair automatically ceases and the chair reverses direction a short distance to increase ease of removal of the obstruction. Still further, in embodiments of the present invention in which the procedure chair is moved using linear actuators driven by electric motors, hall effect sensors can be used in combination with the electric motors to determine the number and direction of motor rotations and thus provide a method of accurately tracking chair position.

In still other preferred embodiments the procedure chair of the present invention can include certain accessories or features that increase the ease and efficiency of examination and surgical procedures, management of the clinical space, or patient comfort, such as storage space built into the chair, heated seating and/or storage areas, or tool rests extending from and attached to the chair for holding tools or other accessories used in procedures performed. Examples of tools and other accessories usable with the procedure chair include exam lights capable of being attached to the chair, IV poles, instrument trays, and arm rests or armboards for proper positioning of a subject's arm(s) for procedures such as the taking of blood pressure, collection of blood sample(s), or performance of outpatient surgical procedures. Still other items that can be used in connection with the procedure chair of the present invention include specific types of light sources such as those used in ophthalmology exams (e.g., blue light source, slit lamp, etc.), dermatological treatments (e.g., photodynamic therapy, laser therapy, etc.), or UV-based light sources such as those used in combination with light-cured adhesives or those used in dermatological procedures that involve treatment of a subject's skin with UV radiation. In still other embodiments, the procedure chair disclosed herein can be used as a mounting or positioning point for X-ray emitting devices used for conducting radiographic imaging, or ultrasound emitting devices used for ultrasonic imaging or other ultrasound-based procedures. Of the above-listed tools and other accessories, many are preferably attached directly to or directly supported by the procedure chair and can in certain preferred embodiments be optionally powered through the procedure chair via power sources located within or on the procedure chair. In still other embodiments, the above-listed tools and other accessories can be attached to accessory rails that are in turn attached to the procedure chair. Preferably the accessory rails attach to the procedure chair via a reversible mechanical connection. In one preferred embodiment this reversible mechanical connection comprises a splined shaft with a clip that can be depressed or a set screw or thumb screw that can be loosened to allow removal of the accessory rail from the splined shaft. The accessory rails can further preferably be mounted near the sitting area or near the seat back. Power sources located within or on the procedure chair can include line voltage outlets, such as standard wall outlets and can also include low voltage power sources such as that provided by a universal serial bus port, or the like. Power provided through the chair can be either alternating current or direct current power.

In still other preferred embodiments of the present invention, the procedure chair can serve as a connection point for certain diagnostic or measurement devices. Examples of such devices include devices for examining cardiac function, such as by ECG, or devices for examining pulmonary or respiratory function, such as by spirometry. In such instances the device can be powered through the procedure chair as well as optionally transfer data using hardware located within the procedure chair. Allowing connection of diagnostic devices to the procedure chair is beneficial because it can eliminate the need for additional independent connection points for such devices within an exam room or clinical space, by providing a single location for connection of all devices.

In yet other preferred embodiments, the procedure chair of the present invention includes a processing system. By processing system it is meant a system that is capable of receiving, generating, handling, storing and/or manipulating digital information. Thus, the procedure chair of the present invention preferably includes at least a microprocessor, a memory, and input and output ports or channels for sending and receiving data. The memory, in addition to being capable of storing data generated by the processor or received via the input port(s), is used to store instructions including commands and processes followed by the processor in controlling adjustment of the chair and other chair features as detailed below. The procedure chair memory is preferably digital memory capable of storing digitized data.

The procedure chair memory is also preferably at least partially comprised of non-volatile digital memory.

The input and output port(s), or communications port(s), of the procedure chair can preferably send and receive data to and from the procedure chair by either wired or wireless transmission or a combination of the two and can handle and produce either digital or analog data. Examples of different types of communications ports include, but are not limited to, serial ports (e.g., various types registered jack ports such as RJ11 or RJ45 format using RS232, IEEE 802.3, or other similar communication standards), universal serial bus (USB) ports, and radio frequency (RF) network interface controllers with their associated antennas (hereinafter, wireless ports). Where appropriate, the input and output port(s) of the procedure chair are capable of interacting with and transmitting data between a number of different other processing systems connected through any type of network, including, for example, local area networks (LAN), personal area networks (PAN) and the Internet. If wireless transmission of data is implemented through a wireless port, it is preferable that the procedure chair includes hardware that allows the procedure chair to communicate wirelessly using any desired or appropriate protocol. Examples of protocols that could be used by the procedure chair to communicate wirelessly through a communication port include, but are not limited to, the Wireless Medical Telemetry Bands, in the 608-614 MHz, 1395-1400 MHz, or 1427-1432 MHz ranges, as well as ZigBee®, Bluetooth®, or IEEE 802.11 communication protocols.

In certain preferred embodiments of the present invention the procedure chair can have more than one communications port. In embodiments of the present invention that use multiple communications ports, it is not required that all ports be of the same type. For example, in certain preferred embodiments, the procedure chair may have multiples of each of USB ports, Ethernet ports, serial ports, and wireless ports, or such other ports as may be desirable for communication of analog or digital data. Multiple communications ports allow the procedure chair to both send and receive information more effectively and efficiently as well as to easily communicate with a number of different devices. By way of example, one can envision a scenario in which the procedure chair is simultaneously connected to both a USB-based device and a device that connects wirelessly to the procedure chair using an RF transceiver. While a more complete explanation of the capability of the procedure chair to interact with and send and receive data to and from various other devices is provided below, the above examples nevertheless serve well to provide a fundamental understanding of the intended scope of the capabilities of the procedure chair of the present invention.

In certain preferred embodiments of the present invention, the procedure chair is capable of sensing the weight of a subject seated on the procedure chair. This is preferably accomplished using a load sensor or a plurality of load sensors positioned within the chair in such a manner that the output of these sensors can be used to determine the weight of a subject when the subject sits on the chair. The weight sensor preferably consists of at least one load sensor capable of producing or modulating an electrical signal that changes in proportion to the weight supported by the sensor. For example, one preferred form of load sensor is a load cell that uses a series of resistors arranged in a Wheatstone bridge configuration. In this arrangement, changes in weight supported by the load cell (e.g. when a patient is seated on the procedure chair) lead to changes in resistance. These changes in resistance are measured and then processed to yield a determination of weight as a measurement of pound force. If more than one load cell is used, the processing system of the procedure chair can accept input from each load cell and then use summing, averaging, and other algorithms to accurately determine the weight of a subject seated on the chair. Once a subject's weight is obtained using the at least one load cell and the processing system of the procedure chair, this weight can then be communicated to other devices connected to the procedure chair and potentially to other locations remote from the procedure chair using the various forms of networks described above.

As mentioned above, in certain preferred embodiments, the procedure chair of the present invention is adjustable by power driven adjustment through the use of various actuators and the like. These actuators and other power-driven adjustment features are preferably controlled via the processing system of the procedure chair. Because the processing system of the procedure chair can accept input from external devices, external devices can be used to accept input from a user of the chair and allow the user to control the chair. This input can then be used to control the positioning of the procedure chair. In this way, a user can conveniently control the position of an adjustable chair using an external device. In various preferred embodiments of the present invention, the external device used to control the positioning of the procedure chair is a handheld control. This handheld control can include various buttons or other input mechanisms to allow the user to make desired adjustments to the position of the chair. In other preferred embodiments, the handheld control can also include the ability, in combination with the processing system of the procedure chair, to assign certain buttons or other inputs on the handheld control to specific chair positions. In this way, the user of the procedure chair can quickly position the procedure chair in an easily repeatable manner. In still other embodiments, the external device used to control positioning of the procedure chair is a foot-operated control wherein the user can adjust the position of the chair by depressing buttons or other input mechanisms with his or her feet. As with the above-described handheld control, the foot-operated control can provide the ability to preset certain chair positions and then easily return to these chair positions when needed by selecting a preset position from the foot control interface. In both the handheld and foot-operated versions of the external control, the control unit can be connected to the chair using either a wired or wireless connection of the types described herein. Furthermore, the external control can, in certain embodiments, include a display area where the weight measurement produced by a procedure chair capable of measuring a subject's weight can be displayed to a clinician or to the user of the chair.

In addition to the above-noted features, the procedure chair preferably also includes a power source for powering the processing system of the procedure chair as well as providing power, where needed, to the sensors, actuators, and/or other devices used in combination with the procedure chair. Because of the power demands of the chair, the power source is preferably line voltage (e.g. 120V, 60 Hz A/C; 220V, 50 Hz A/C) filtered through appropriate regulators so as to provide the correct level of power to the various component parts of the procedure chair.

In certain preferred embodiments of the present invention, the procedure chair is upholstered. Preferably this upholstery is of non-absorbent material that can be easily cleansed using liquid solvents without significant degradation of the upholstery material. Accordingly, the upholstery generally comprises a synthetic leather material such as those made with a fabric base to which is adhered a polymeric (e.g., vinyl, polyurethane, etc.) top layer. In still other instances, the upholstery may be comprised of genuine leather. In all instances the upholstery preferably exhibits a high degree of flexibility.

In certain preferred embodiments of the present invention, the seat back and sitting area of the procedure chair are connected with a continuous piece of upholstery used to cover both the seat back and the sitting area. By use of a continuous piece of upholstery it is not meant that only a single piece of upholstery material is used to cover the seat back, sitting area, and hinge area. While a single piece of upholstery material may be used in certain embodiments of the present invention, in other embodiments the upholstery may comprise a number of seams or areas of connection between upholstery pieces of different sizes and/or shapes, connected so as to provide proper fit and function as the procedure chair is moved and adjusted. Use of a continuous piece of upholstery between the seat back and the sitting area is advantageous inasmuch as it provides a barrier that prevents dust, detritus, and other debris from collecting in the space between the seat back and the sitting area. It also allows the entirety of the patient-contacting area of the procedure chair to be easily cleaned.

In certain preferred embodiments of the present invention, the seat back of the chair slides toward the sitting area of the chair as the seat back is reclined. The seat back likewise slides away from the sitting area of the chair as the seat back is moved to an upright position. This is accomplished through a series of mechanical connections detailed in U.S. Pat. No. 6,212,713, which is hereby incorporated in its entirety by reference. Preferably the total linear distance moved by the seat back as it slides through its range of motion is less than 8 inches and more preferably about 6 inches.

Because the seat back in certain embodiments of the present invention slides as just described, it is important that the upholstery material between the seat back and the sitting area be able to fold or compress as the seat back slides closer to the sitting area upon reclining of the seat back. This can be accomplished in a number of ways, including the simple use of a piece of flexible upholstery. However, one preferred embodiment of the present invention uses an upholstered hinge that comprises a polymeric living hinge that is connected between the sitting area and the seat back and to which the flexible upholstery material is attached. The polymer base of the living hinge is preferably composed of a piece or pieces of polyethylene or polypropylene of appropriate flexibility, but can be comprised of various other appropriately flexible elastomeric, thermoset, or thermoplastic polymers (e.g., polyurethanes, polystyrenes, polyethylene terephthalate, etc.). The polymer base is then preferably scored or appropriately molded with relief notches to provide areas or specific points at which the polymer base will consistently and repeatably fold or flex, thus becoming a living hinge.

In practice, the polymer base of the hinge can have a number of layers added to it to ensure that it blends well and functions well with the sitting area and seat back. These layers can include one or multiple layers of adhesive, foam backing between the polymer base and the upholstery material, as well as the upholstery material itself.

While it is preferred that a continuous piece of upholstery be used to cover all of the seat back, hinge, and sitting area, in certain embodiments of the present invention, the seat back, hinge, and sitting area can each be separately upholstered and then connected upon assembly of the procedure chair. Alternatively, the hinge can be connected only to the seat back or sitting area and upholstered in unison with such an area (i.e., a continuous piece of upholstery used to upholster only seat back and hinge or only sitting area and hinge) and then the remaining section connected to the hinge during assembly of the procedure chair.

The above description of the preferred embodiments has been largely focused on description of the individual elements of the invention. However, figures are useful in gaining a greater understanding of the present invention. To this end, a number of illustrative figures are discussed in greater detail below.

Figure 2:
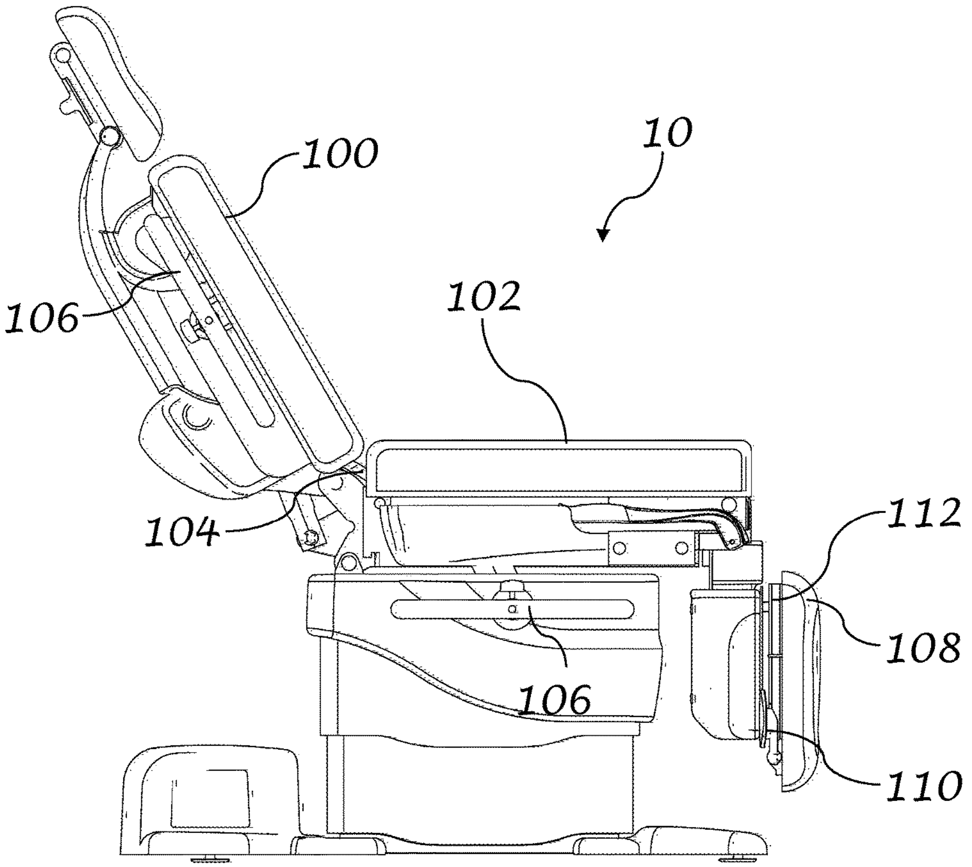
FIG. 2 Side view of the procedure chair of one embodiment of the present invention.

There is shown in FIG. 1 and FIG. 2 one embodiment of the procedure chair 10 of the present invention. Illustrated in FIG. 1 and FIG. 2 is the seat back 100, sitting area 102 and hinge 104 that serves to connect the sitting area to the seat back. Also shown in FIG. 1 and FIG. 2 are removable accessory rails 106 for mounting certain of the above-mentioned accessories to the procedure chair, foot support 108 for elevating and supporting a subject's lower legs and feet when seated on the procedure chair, and an adjustment switch, or lever, 110 for disengaging the latching mechanism when adjusting the foot support on the above-mentioned track system 112. Specifically, when the foot support 108 is being used to support the lower legs or feet of a subject seated in the procedure chair, lever 110 can be activated by a user of the chair and the foot support surface 108 can be moved along the track system 112 to be adjusted either closer to (i.e. more proximal to) the chair seating area 102 or farther from (i.e., more distal from) the chair seating area 102 in order to more comfortably accommodate a subject seated thereon. Once in the desired position, lever 110 is released by the user and the foot support 108 is locked into the new desired position.

Figure 3:
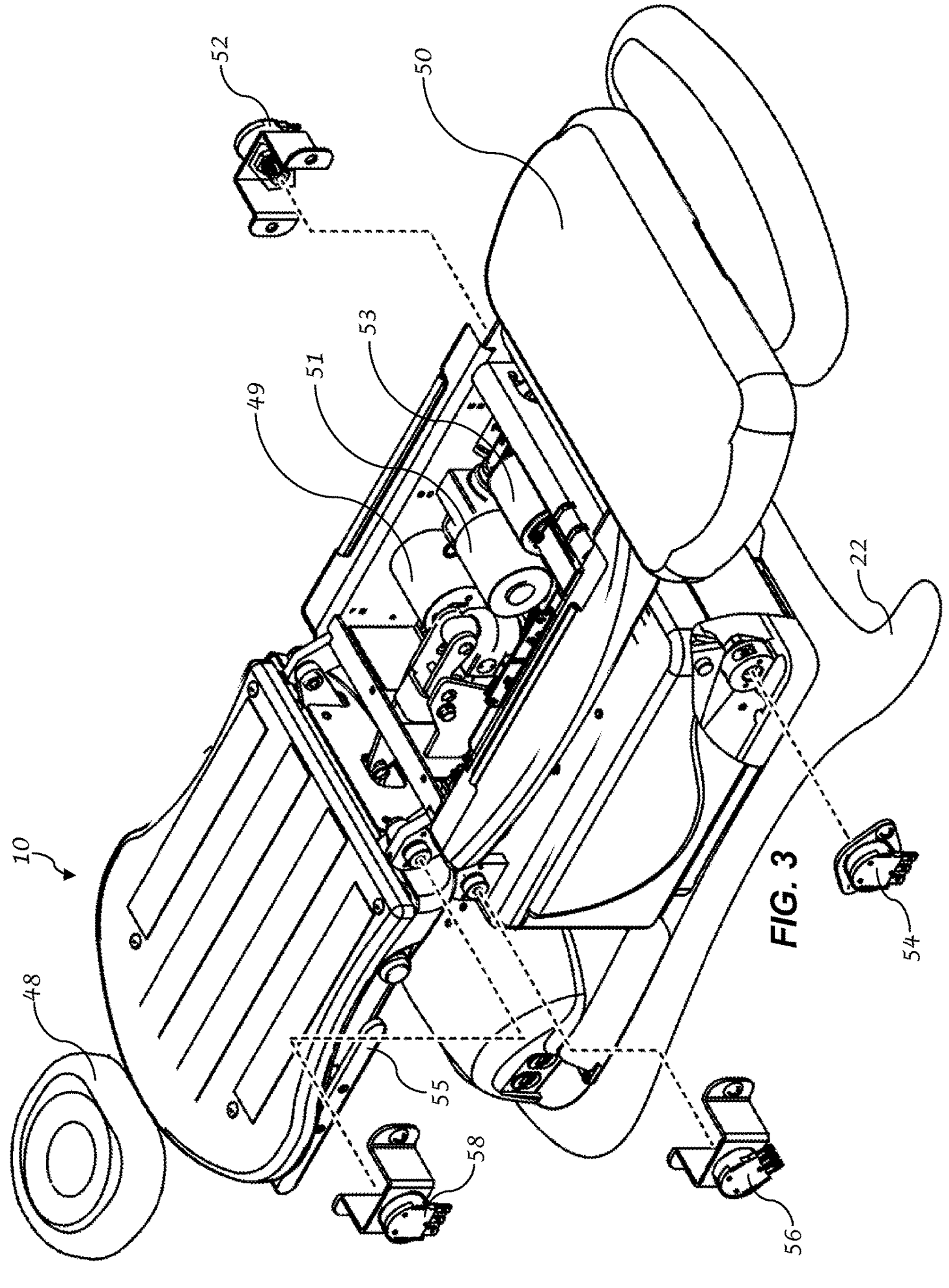
FIG. 3 Perspective drawing of one embodiment of the procedure chair of the present invention illustrating, among other features, the location of limit switches and actuators used in controlling position of the exam table.

Turning now to a description of FIG. 3, there is shown another embodiment of the procedure chair 10 of the present invention. Illustrated in FIG. 3 are limit switches 52, 54, 56, 58, which serve to stop movement of the procedure chair 10 beyond certain points determined by the limit switch settings. Specifically, limit switch 52 limits movement of the foot support, limit switch 54 serves to limit adjustment of chair height, limit switch 56 limits the elevation angle (or degree of incline) of the sitting area of the procedure chair, and limit switch 58 limits degree of incline of the back support area of the procedure chair. FIG. 3 further illustrates the location of several linear actuators 49, 51, 53 that are used in controlling adjustment of the procedure chair. In particular, linear actuator 49 controls the elevation angle of the sitting area of the procedure chair, linear actuator 51 controls adjustment of the foot support, and linear actuator 53 controls the degree of incline of the back support area.

Figure 4:
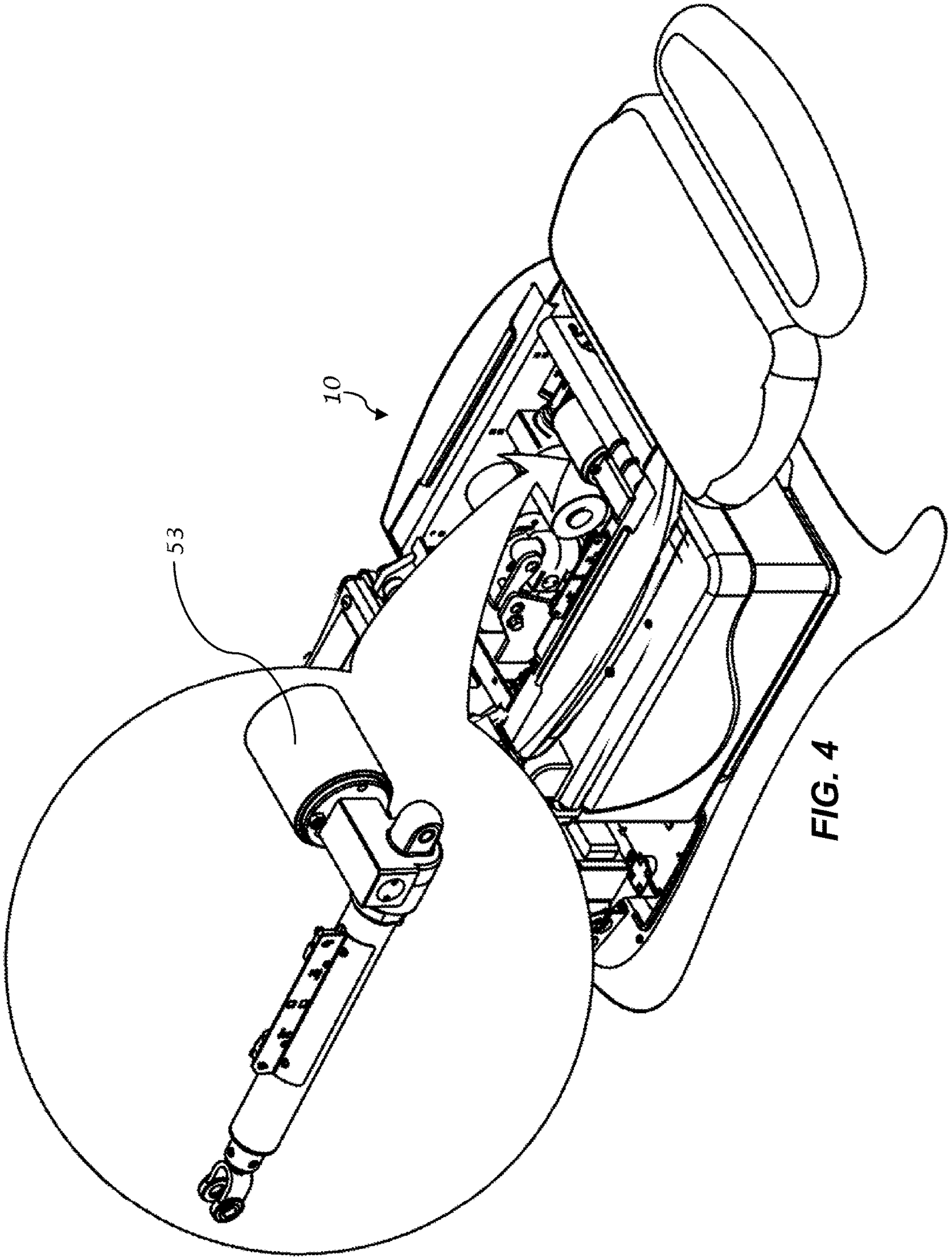
FIG. 4 Perspective drawing of one embodiment of the procedure chair of the present invention providing a detailed view of one of the chair actuators.

In FIG. 4 a magnified view of the back support linear actuator 53 used in adjusting the degree of incline of the back support area of the procedure chair illustrated in FIG. 3 is shown. This magnified view illustrates how the linear actuator is oriented within the chair housing and provides a clear illustration of the overall form of one type of linear actuator that can be used in the present invention.

Figure 5:
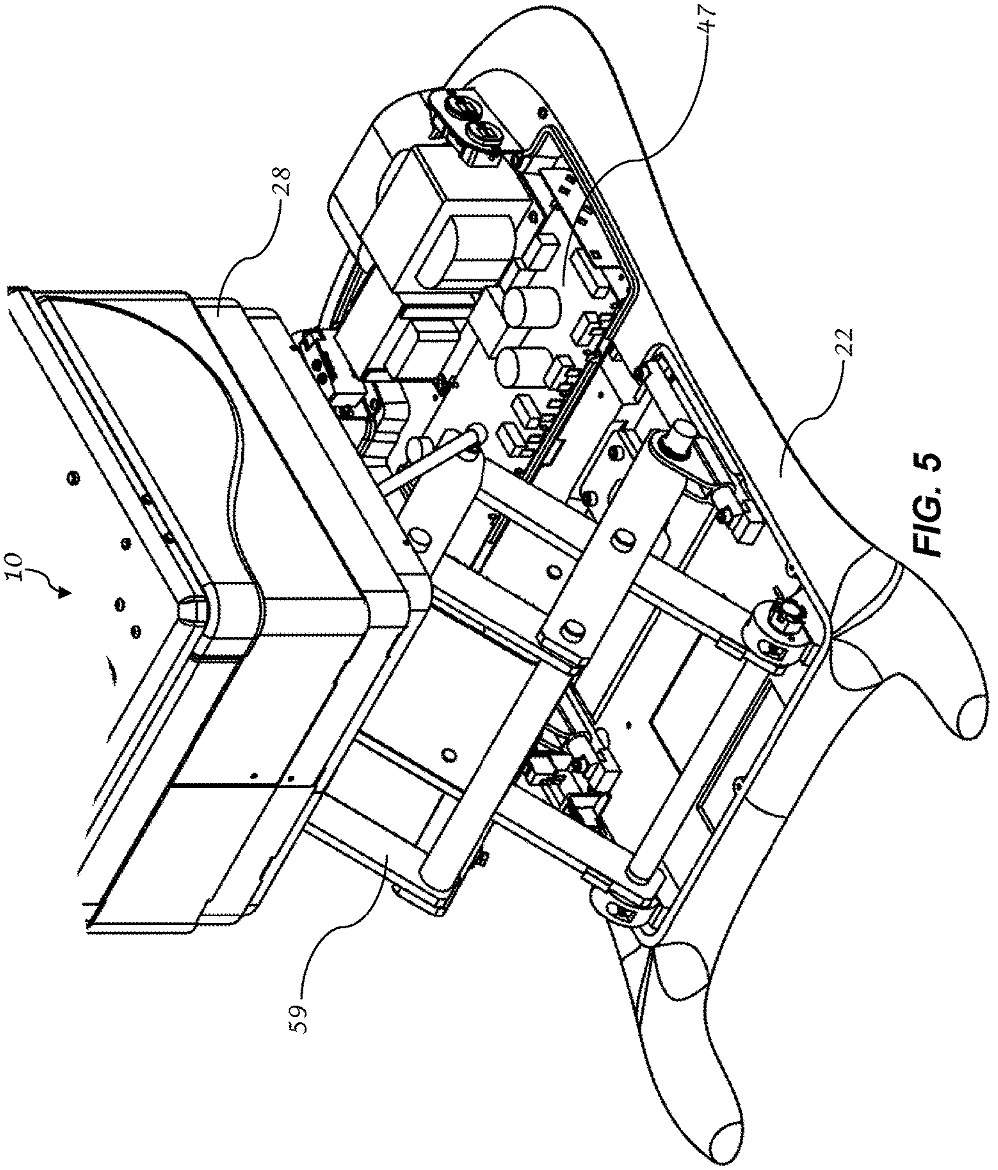
FIG. 5 Perspective drawing of a portion of one embodiment of the procedure chair of the present invention illustrating structural and other features of the exam table.

Turning now to a description of FIG. 5, there is shown close-up view of the scissors mechanism 59 and other hardware included in the embodiment of the procedure chair 10 illustrated in FIG. 3. The scissors mechanism is preferably connected to a linear actuator (not shown), which, when extended causes an increase in chair height and when retracted leads to a decrease in chair height. Also shown in FIG. 5 is a printed circuit board 47 and other electronics attached to the base 22 of the procedure chair. While specific features of the printed circuit board 47 are not discussed in reference to FIG. 5, it will be understood that the printed circuit board 47 generally serves as the processing system of the procedure chair and thus includes at least a processor, digital memory, and input and/or output port(s).

Figure 6:
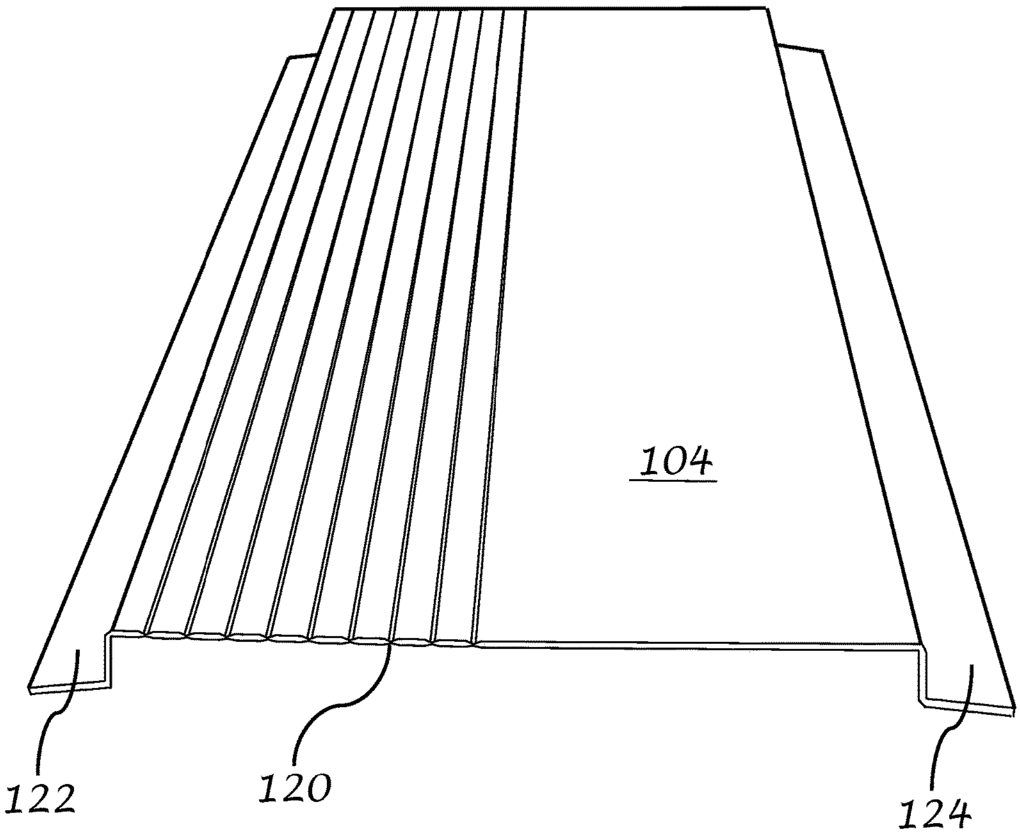
FIG. 6 An illustration of one embodiment of a living hinge of the present invention.
Figure 7:
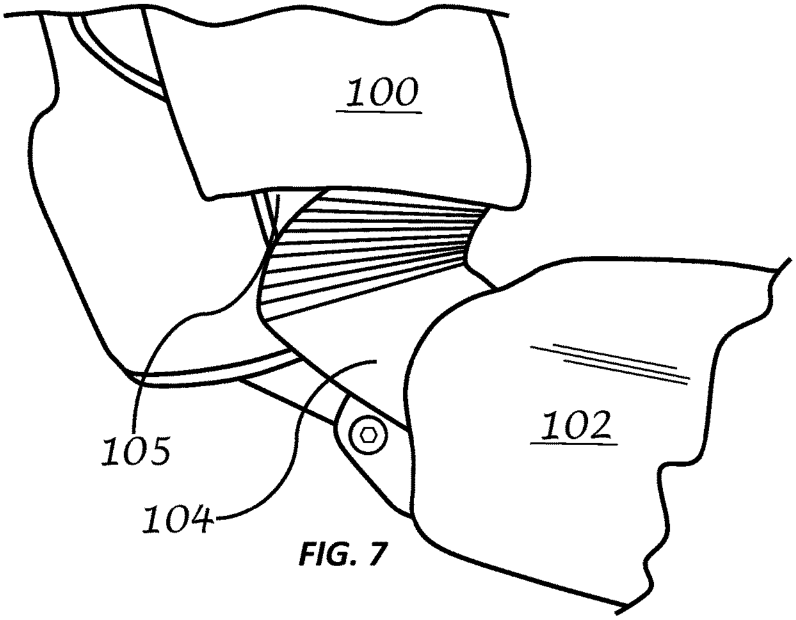
FIG. 7 A close up view of the procedure chair of the present invention with the seat back in an upright position and showing a living hinge connecting the sitting area and the seat back.
Figure 8:
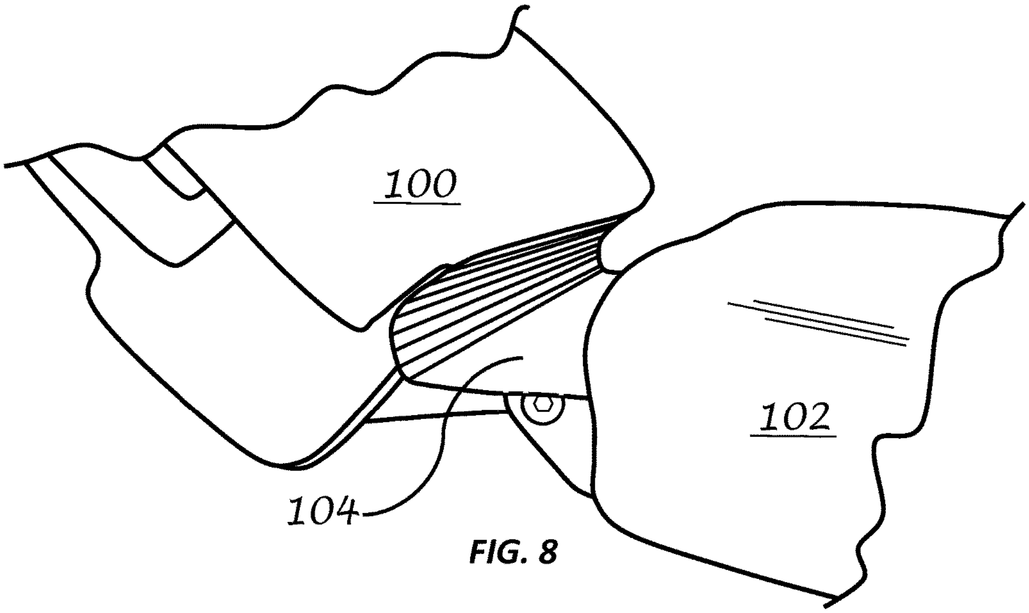
FIG. 8 A close up view of the procedure chair of the present invention with the seat back in a first reclined position and showing a living hinge connecting the sitting area and the seat back.
Figure 9:
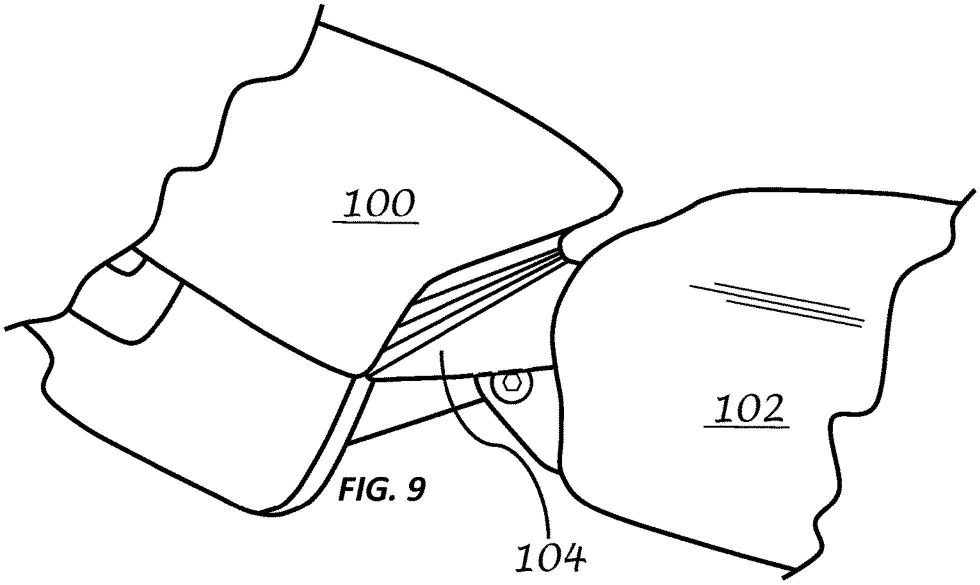
FIG. 9 A close up view of the procedure chair of the present invention with the seat back in a second reclined position and showing a living hinge connecting the sitting area and the seat back.

In FIG. 6 is shown one preferred embodiment of hinge 104 used to connect the sitting area of the procedure chair to the seat back. The embodiment of the hinge 104 shown in FIG. 6 is preferably comprised of polymer and is preferably formed in such a way that it functions through repeated flexing cycles as a living hinge. Relief notches 120 that serve as a series of individual living hinges are also shown. These relief notches 120 are preferably located in such a way so as to ensure that the hinge 104 functions in the desired manner in folding and flexing beneath the seat back 100 when the procedure chair is reclined. Attachment tabs 122, 124 allow the hinge to be attached to the seat back and sitting area, respectively. It will also be noted that the hinge of FIG. 6 includes an upper half and a lower half, with the relief notches 120 being confined to the upper half of the hinge since it is the upper half that flexes to fold beneath the seat back 100.

Figure 10:
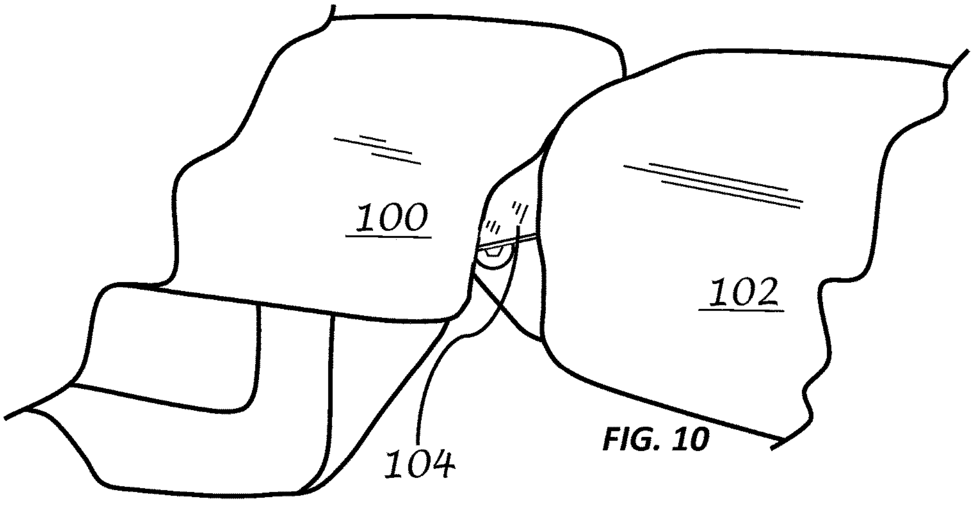
FIG. 10 A close up view of the procedure chair of the present invention with the seat back in a fully reclined position and showing a living hinge connecting the sitting area and the seat back.

In FIG. 7 through FIG. 10 are shown successive close-up views of hinge 104 shown in FIG. 6, illustrating how the hinge 104 connects seat back 100 and to sitting area 102 and also how the hinge 104 folds and flexes to fit underneath seat back 100 when the seat back is reclined. It will be noted that hinge 104 in FIG. 7 through FIG. 10 is unupholstered in order to more clearly show the function of the relief notches 120 in allowing the hinge to flex as seat back 100 moves closer to (i.e., more proximal to) the sitting area as the seat back is reclined. It will also be noted that seat back 100 includes an opening, or recess, 105 into which hinge 104 is able to flex or fold. Thus, as illustrated in FIG. 10, when the seat back is in the fully reclined position the hinge 104 is largely concealed by the seat back 100. This style of continuous connection between the sitting area and the seat back is advantageous for a number of reasons, including allowing easy cleanup, providing a barrier to prevent debris and detritus from collecting in the space between the sitting area and the seat back, and providing the proper flex and folding mechanism to allow use with a sliding seat back as described in above-mentioned U.S. Pat. No. 6,212,713.

Figure 11:
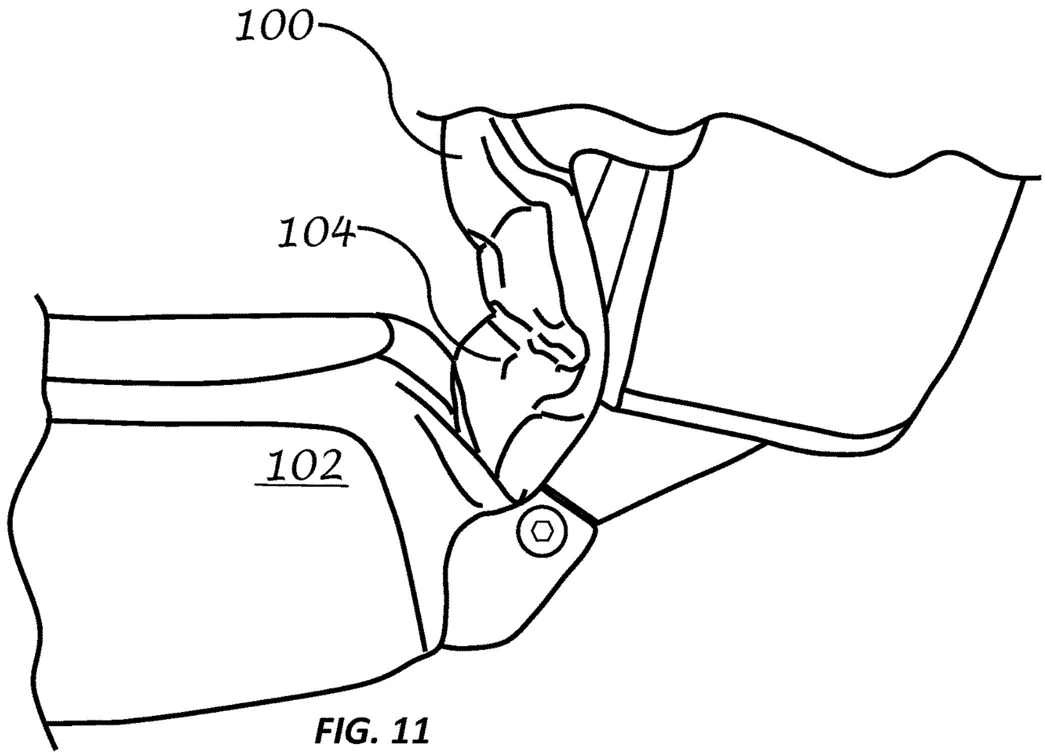
FIG. 11 A close up view of the procedure chair of the present invention with the seat back in an upright position and showing an upholstered living hinge connecting the sitting area and the seat back.
Figure 12:
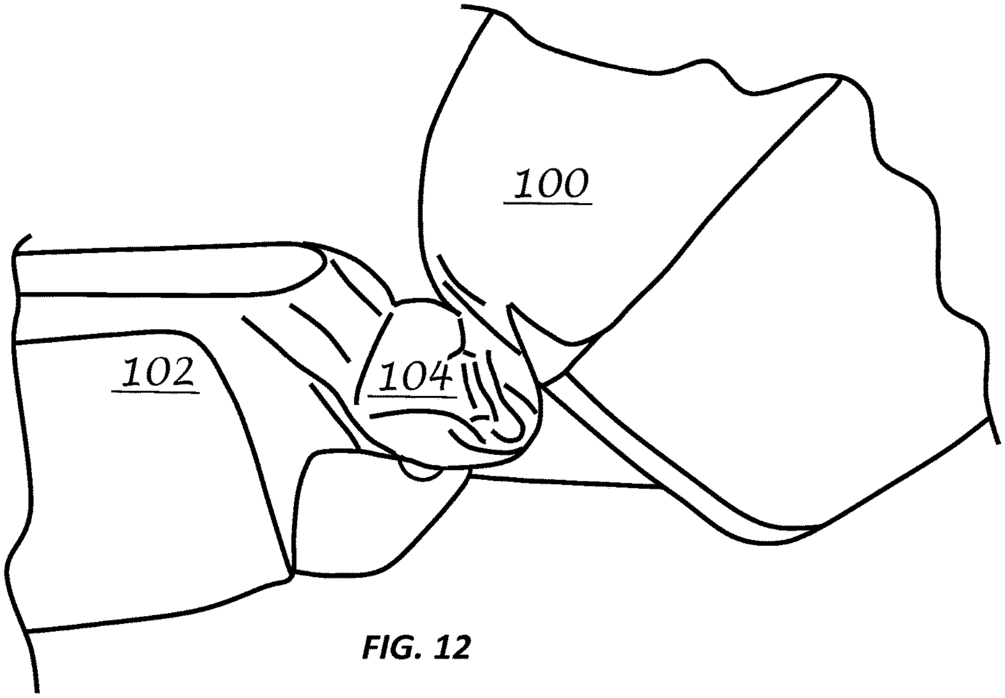
FIG. 12 A close up view of the procedure chair of the present invention with the seat back in a first reclined position and showing an upholstered living hinge connecting the sitting area and the seat back.
Figure 13:
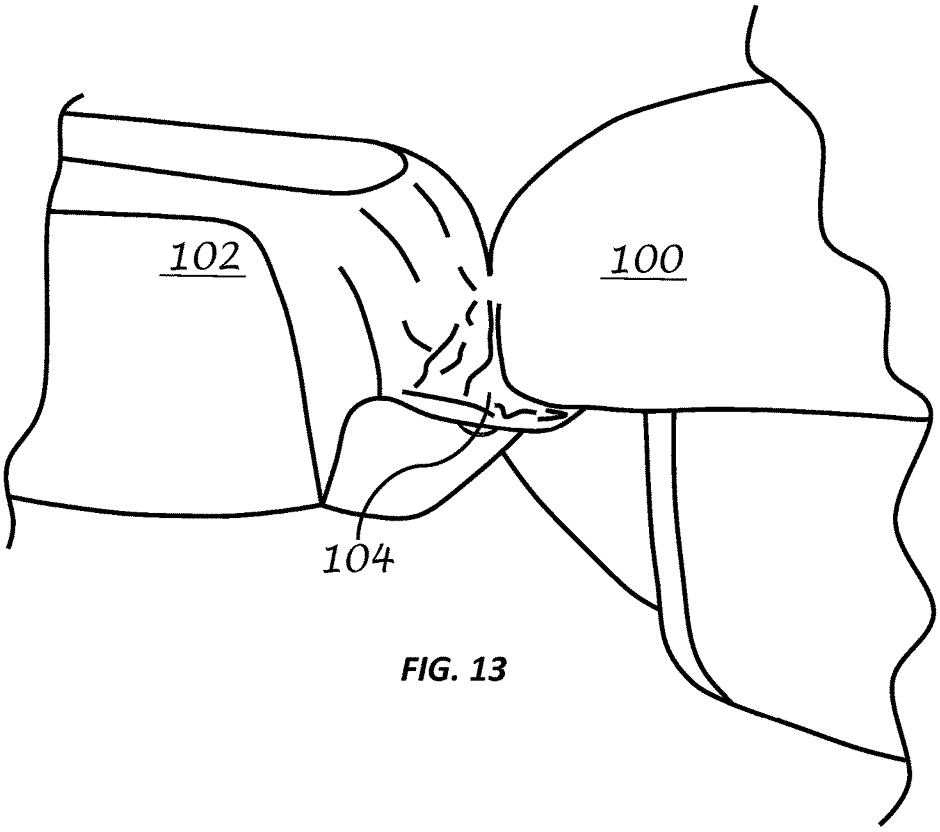
FIG. 13 A close up view of the procedure chair of the present invention with the seat back in a fully reclined position and showing an upholstered living hinge connecting the sitting area and the seat back.

In FIG. 11 through FIG. 13 are shown another set of close-up successive views of an upholstered hinge of the present invention illustrating how a continuous piece of upholstery can be used to cover all of hinge 104, seat back 100 and sitting area 102. In addition to an upholstery covering, the hinge can also include foam padding or filling to between the hinge substrate and the upholstery covering to further increase aesthetic appeal and ease of covering the hinge with upholstery material. FIG. 11 through FIG. 13 also illustrates how an upholstered hinge 104 folds and flexes to fit underneath seat back 100 as the procedure chair is reclined and the seat back is brought into closer proximity to the sitting area. In addition to the already-noted advantages of such a hinge design, the addition of upholstery to the hinge also provides significant aesthetic benefits.

It will be apparent to those skilled in the art that various modifications and variations can be made to the present invention without departing from the spirit and scope of the invention as set forth in the above description. Thus, it is intended that the present invention cover the modifications and variations of this invention provided they come within the scope of the invention and its equivalents.

What is claimed is:

1. An adjustable medical procedure chair comprising:

a substantially horizontal sitting area, the sitting area having a front-facing edge and a rear-facing edge;

a sliding seat back section having a lower edge positioned nearest the rear-facing edge of said sitting area and an upper edge positioned opposite said lower edge, the upper edge and lower edge of the seat back section defining a planar lengthwise dimension of said seat back section, and wherein the sliding seat back section is moveable between an inclined position substantially perpendicular to said sitting area and a reclined position substantially parallel to said sitting area;

a linkage structure connected to said sliding seat back section operable to cause the lower edge of said sliding seat back section to move closer to the rear-facing edge of said sitting area as the seat back section is reclined and away from the rear-facing edge of the sitting area as the seat back section is inclined;

a hinge connecting the rear-facing edge of said sitting area to the lower edge of said seat back section; and wherein said sliding seat back section further comprises a recess beneath said lower edge of the seat back section into which said hinge can fold when the seat back section is in the reclined position.

2. The medical procedure chair of claim 1 wherein the hinge is upholstered in such a way as to form a continuous upholstery connection between the sitting area, the hinge, and the seat back.

3. The medical procedure chair of claim 2 wherein the upholstery material comprises synthetic leather.

4. The medical procedure chair of claim 1 wherein the hinge is a living hinge comprised of polymer.

5. The medical procedure chair of claim 4 wherein the polymer living hinge is comprised of polypropylene.

6. The medical procedure chair of claim 4 wherein the polymer living hinge is comprised of polyethylene.

7. The medical procedure chair of claim 4 wherein the polymer living hinge includes a plurality of relief notches.

8. The medical procedure chair of claim 7 wherein the polymer living hinge includes an upper half and a lower half and the plurality of relief notches are located only in either the upper half or the lower half of the polymer living hinge.

9. The medical procedure chair of claim 1 wherein the distance traversed by the sliding seat back section as the seat back is moved from fully inclined to fully reclined is about 6 inches.

10. An adjustable medical procedure chair comprising:

a substantially horizontal sitting area, the sitting area having a front-facing edge and a rear-facing edge;

a sliding seat back section having a lower edge positioned nearest the rear-facing edge of said sitting area and an upper edge positioned opposite said lower edge, the upper edge and lower edge of the seat back section defining a planar lengthwise dimension of said seat back section, and wherein the sliding seat back section is moveable between an inclined position substantially perpendicular to said sitting area and a reclined position substantially parallel to said sitting area;

a linkage structure connected to said sliding seat back section operable to cause the lower edge of said sliding seat back section to move closer to the rear-facing edge of said sitting area as the seat back section is reclined and away from the rear-facing edge of the sitting area as the seat back section is inclined; and a hinge connecting the rear-facing edge of said sitting area to the lower edge of said seat back section, said hinge comprising a polymer living hinge that includes a plurality of relief notches.

11. The medical procedure chair of claim 10 wherein the hinge is upholstered in such a way as to form a continuous upholstery connection between the sitting area, the hinge, and the seat back.

12. The medical procedure chair of claim 11 wherein the upholstery material comprises synthetic leather.

13. The medical procedure chair of claim 10 wherein the polymer living hinge is comprised of polypropylene.

14. The medical procedure chair of claim 10 wherein the polymer living hinge is comprised of polyethylene.

15. The medical procedure chair of claim 10 wherein the distance traversed by the sliding seat back section as the seat back is moved from fully inclined to fully reclined is about 6 inches.

16. The medical procedure chair of claim 10 wherein the polymer living hinge includes an upper half and a lower half and the plurality of relief notches are located only in either the upper half or the lower half of the polymer living hinge.

17. An adjustable medical procedure chair comprising:

a substantially horizontal sitting area, the sitting area having a front-facing edge and a rear-facing edge;

a sliding seat back section having a lower edge positioned nearest the rear-facing edge of said sitting area and an upper edge positioned opposite said lower edge, the upper edge and lower edge of the seat back section defining a planar lengthwise dimension of said seat back section, wherein the sliding seat back section is moveable between an inclined position substantially perpendicular to said sitting area and a reclined position substantially parallel to said sitting area, and wherein the lower edge of said sliding seat back section moves closer to the rear-facing edge of said sitting area as the seat back section is reclined and away from the rear-facing edge of the sitting area as the seat back section is inclined;

a hinge connecting the rear-facing edge of said sitting area to the lower edge of said seat back section; and wherein the seat back section further comprises a recess beneath said lower edge of the seat back section into which said hinge can fold when the seat back section is in the reclined position.

18. The medical procedure chair of claim 17 wherein the hinge is a living hinge comprised of polymer.

* * * * *